United States Patent
Srivastava et al.

(10) Patent No.: US 12,523,831 B2
(45) Date of Patent: Jan. 13, 2026

(54) MULTI-SUBSTRATE COUPLING FOR PHOTONIC INTEGRATED CIRCUITS

(71) Applicant: GlobalFoundries U.S. Inc., Malta, NY (US)

(72) Inventors: Ravi Prakash Srivastava, Clifton Park, NY (US); Yusheng Bian, Ballston Lake, NY (US); Vibhor Jain, Clifton Park, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 307 days.

(21) Appl. No.: 18/338,712

(22) Filed: Jun. 21, 2023

(65) Prior Publication Data

US 2024/0427095 A1 Dec. 26, 2024

(51) Int. Cl.
*H04B 10/00* (2013.01)
*G02B 6/42* (2006.01)

(52) U.S. Cl.
CPC ......... *G02B 6/4293* (2013.01); *G02B 6/4243* (2013.01); *G02B 6/4283* (2013.01)

(58) Field of Classification Search
CPC .. G02B 6/4293; G02B 6/4243; G02B 6/4283; G02B 6/12002; G02B 6/126; G02B 6/305
See application file for complete search history.

(56) References Cited

U.S. PATENT DOCUMENTS

| | | | |
|---|---|---|---|
| 10,054,745 B2 * | 8/2018 | Webster | G02B 6/1228 |
| 10,224,286 B1 * | 3/2019 | England | H01L 23/49 |
| 10,566,287 B1 * | 2/2020 | Ding | H01L 23/5384 |
| 11,650,381 B1 * | 5/2023 | Polomoff | G02B 6/30 385/49 |
| 11,662,523 B2 * | 5/2023 | Bian | G02B 6/305 385/49 |
| 12,259,579 B1 * | 3/2025 | Dudley | G02B 6/305 |
| 2018/0031791 A1 * | 2/2018 | Israel | G02B 6/4206 |
| 2021/0109290 A1 * | 4/2021 | Kimerling | G02B 6/4228 |
| 2021/0109302 A1 * | 4/2021 | Lim | G02B 6/3636 |
| 2022/0043221 A1 * | 2/2022 | Kopp | G02B 6/4249 |
| 2022/0308297 A1 * | 9/2022 | Polomoff | G02B 6/30 |
| 2023/0228953 A1 * | 7/2023 | Venkatesan | G02B 6/4249 385/52 |
| 2023/0367087 A1 * | 11/2023 | Mayukh | G02B 6/4204 |
| 2023/0384542 A1 * | 11/2023 | Saito | G02B 6/4213 |
| 2024/0272388 A1 * | 8/2024 | Li | G02B 6/4243 |

(Continued)

OTHER PUBLICATIONS

Bian, Yusheng et al.; "3D Integrated Laser Attach Technology on 300-mm Monolithic Silicon Photonics Platform"; IEEE Xplore; Downloaded Apr. 5, 2023; Copyright 2020 IEEE; p. 2.

(Continued)

*Primary Examiner* — Agustin Bello
(74) *Attorney, Agent, or Firm* — Francois Pagette; Hoffman Warnick LLC

(57) ABSTRACT

Embodiments of the disclosure provide a multi-substrate coupling for photonic integrated circuits (PICs). Structures of the disclosure may include a first substrate having a first surface. The first surface includes a groove therein. A second substrate has a second surface coupled to the first surface. The second substrate includes a cavity substantially aligned with the groove of the first surface, and a photonic integrated circuit (PIC) structure horizontally distal to the cavity.

20 Claims, 14 Drawing Sheets

(56) References Cited

U.S. PATENT DOCUMENTS

| | | | | |
|---|---|---|---|---|
| 2024/0272389 A1* | 8/2024 | Shao | | G02B 6/4214 |
| 2024/0288639 A1* | 8/2024 | Rudnick | | G02B 6/4243 |
| 2024/0361545 A1* | 10/2024 | Wu | | H01L 23/562 |
| 2024/0427095 A1* | 12/2024 | Srivastava | | G02B 6/4293 |
| 2025/0154053 A1* | 5/2025 | Ndieguene | | G02B 6/107 |

OTHER PUBLICATIONS

Yang, Yan et al.; "3D Silicon Photonics Packaging Based on TSV Interposer for High Density On-Board Optics Module"; IEEE Xplore; Downloaded Apr. 5, 2023; Copyright 2016 IEEE; p. 7.

Giewont, Ken et al.; "300-mm Monolithic Silicon Photonics Foundry Technology"; IEEE Journal of Selected Topics in Quantum Electronics; vol. 25; No. 5; Sep./Oct. 2019; Copyright 2019 IEEE; pp. 11.

Rakowski, Michal et al.; "45nm CMOS—Silicon Photonics Monolithic Technology (45CLO) for next-generation, low power and high speed optical interconnects"; OSA 2020; Copyright 2020 OFC; p. 3.

Peng, Bo et al.; "A CMOS Compatible Monolithic Fiber Attached Solution with Reliable Performance and Self-alignment"; OSA 2020; Copyright 2020 OFC; p. 3.

Bian, Yusheng et al.; "Monolithically integrated self-aligned SiN edge coupler with <0.6/0.8 dB TE/TM insertion loss, <-39 dB back reflection and >520 mW high-power handling capability"; Optica Publishing Group 2023; Copyright 2023 OFC; p. 3.

Bogaerts, L. et al.; "High-Speed TSV Integration in an Active Silicon Photonics Interposer Platform"; IEEE Xplore; Downloaded Apr. 5, 2023; Copyright 2018 IEEE; p. 3.

He, Junwen et al.; "U-Groove Assisted Passive Assembly of 30x Single-Mode Fiber Array to Edge Couplers for Silicon Photonics"; 2021 IEEE Photonics Conference (IPC); Copyright 2021 IEEE; p. 2.

He, Junwen et al.; "V-Groove Assisted Passive Assembly of Single-Mode Fibers to Ultra-Broadband Polarization-Insensitive Edge Couplers for Silicon Photonics"; IEEE Xplore; Downloaded Apr. 5, 2023; p. 4.

* cited by examiner

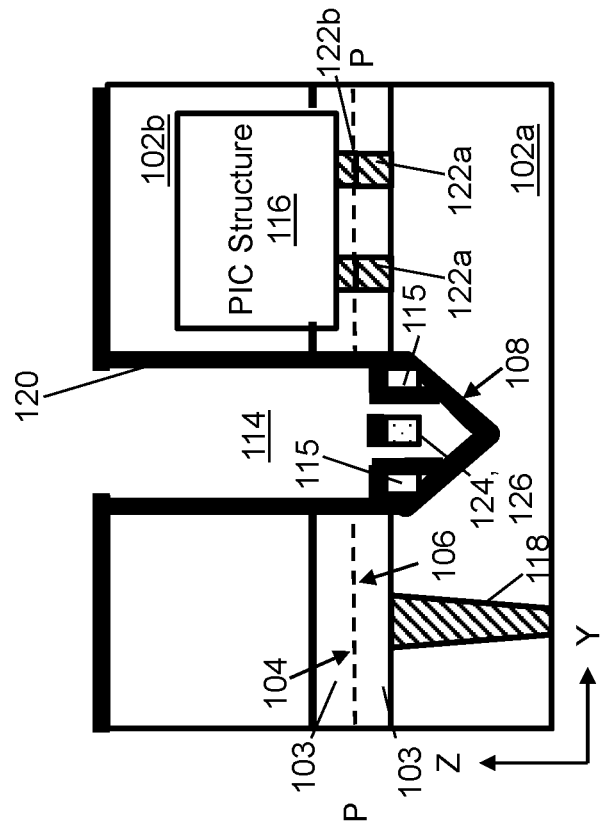
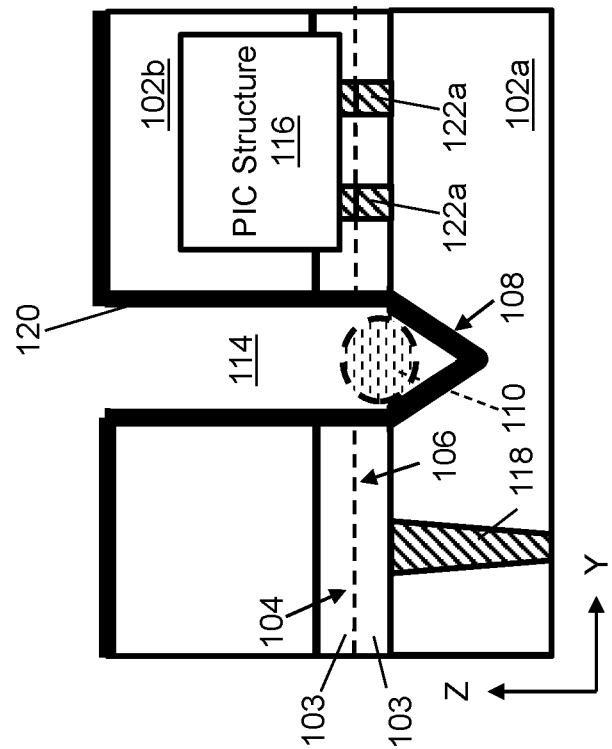

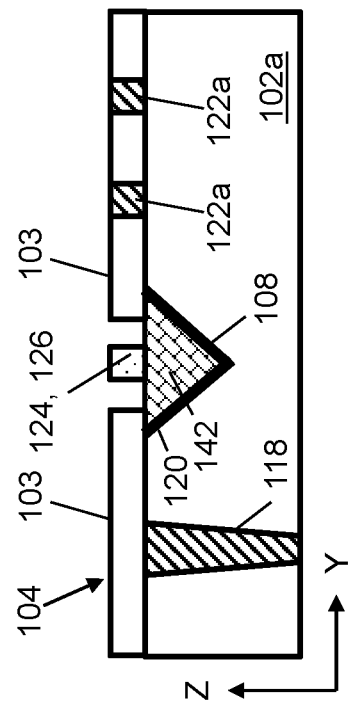
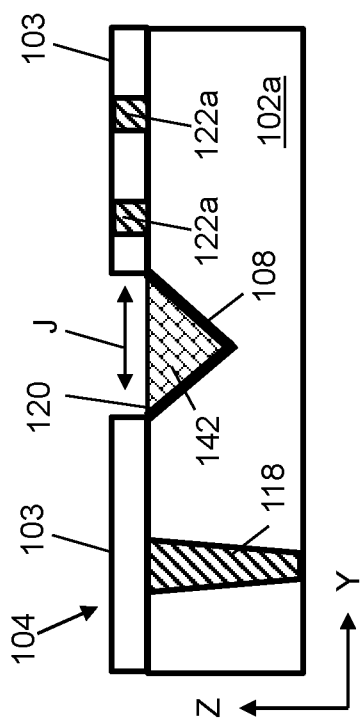
FIG. 12A
FIG. 12B

MULTI-SUBSTRATE COUPLING FOR PHOTONIC INTEGRATED CIRCUITS

BACKGROUND

The present disclosure relates to semiconductor structures and, more particularly, to a multi-substrate coupling for photonic integrated circuits (PICs).

The rise of networking devices, such as the "Internet of Things" (IoT), with links to a data center has accompanied a larger number of signal-processing elements in semiconductor wafers. Semiconductor chips may be modified, adapted, etc., to house the various components needed to transport optical signals from one component to another. Semiconductor chips which include photonic devices and microcircuitry are known as "photonic integrated circuits" (PICs). PIC dies typically include optical components on the surface, embedded in, and/or at the edge of a PIC die to transport optical signals into and/or from the optical devices therein, such as waveguides and grating couplers. The various optical components, e.g., photonic waveguides, photonic transmitters, receivers, etc., can relay signals through the PIC die.

Integrating the complementary metal oxide semiconductor (CMOS) and photonic components into one device typically requires forming light coupling elements and the attachment of fibers and/or laser emitters. Fibers are attached to the device through surface features such as V-grooves. A technical challenge associated with forming surface features for fiber attachment in a device is that, typically, such features can only be formed after other portions of the PIC die are fabricated. Thus, it may be difficult to account for the location of such features when fabricating certain active portions of a PIC structure.

SUMMARY

All aspects, examples and features mentioned below can be combined in any technically possible way.

An aspect of the disclosure provides a structure including: a first substrate having a first surface, the first surface having a groove therein; and a second substrate having a second surface coupled to the first surface, wherein the second substrate includes: a cavity substantially aligned with the groove of the first surface, and a photonic integrated circuit (PIC) structure horizontally distal to the cavity.

An aspect of the disclosure provides a method including: forming a groove within a first surface of a first substrate; forming a cavity within a second surface of a second substrate, wherein the cavity is horizontally distal to a photonic integrated circuit (PIC) within the second substrate; and coupling the first surface to the second surface, wherein the cavity is substantially aligned with the groove.

An aspect of the disclosure provides a method including: forming a groove within a first surface of a first substrate, wherein the first substrate includes a conductor horizontally distal to the groove; forming a cavity within a second surface of a second substrate, wherein the cavity is horizontally distal to a photonic integrated circuit (PIC) within the second substrate; forming a waveguide within one of the first substrate and the second substrate above a first portion of the groove; and providing an optical fiber within a second portion of the groove, wherein the optical fiber is aligned with the waveguide; and coupling the first surface to the second surface, wherein the cavity is substantially aligned with the groove.

Two or more aspects described in this disclosure, including those described in this summary section, may be combined to form implementations not specifically described herein. The details of one or more implementations are set forth in the accompanying drawings and the description below. Other features, objects and advantages will be apparent from the description and drawings, and from the claims.

BRIEF DESCRIPTION OF THE DRAWINGS

The embodiments of this disclosure will be described in detail, with reference to the following figures, wherein like designations denote like elements, and wherein:

FIGS. 8A-10B depict methods of forming a structure according to embodiments of the disclosure.

FIG. 11A-14B depict methods of forming a structure according to further embodiments of the disclosure.

Figure 1:
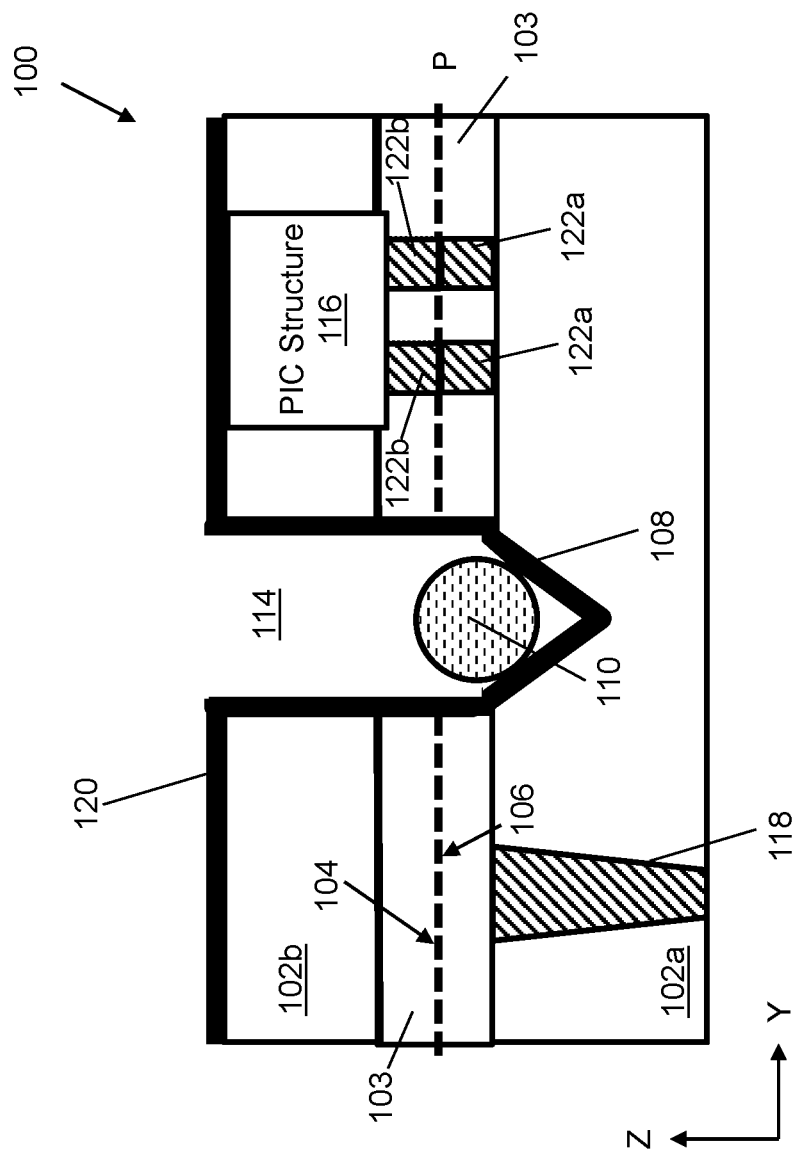
FIG. 1 shows a first cross-sectional view of a structure according to embodiments of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

In the following description, reference is made to the accompanying drawings that form a part thereof, and in which is shown by way of illustration specific illustrative embodiments in which the present teachings may be practiced. These embodiments are described in sufficient detail to enable those skilled in the art to practice the present teachings, and it is to be understood that other embodiments may be used and that changes may be made without departing from the scope of the present teachings. The following description is, therefore, merely illustrative.

It will be understood that when an element such as a layer, region, or substrate is referred to as being "on" or "over" another element, it may be directly on the other element or intervening elements may also be present. In contrast, when an element is referred to as being "directly on" or "directly over" another element, there may be no intervening elements present. It will also be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present.

Reference in the specification to "one embodiment" or "an embodiment" of the present disclosure, as well as other variations thereof, means that a particular feature, structure, characteristic, and so forth described in connection with the embodiment is included in at least one embodiment of the present disclosure. Thus, the phrases "in one embodiment" or "in an embodiment," as well as any other variations appearing in various places throughout the specification are not necessarily all referring to the same embodiment. It is to be appreciated that the use of any of the following "/," "and/or," and "at least one of," for example, in the cases of "A/B," "A and/or B" and "at least one of A and B," is intended to encompass the selection of the first listed option (A) only, or the selection of the second listed option (B) only, or the selection of both options (A and B). As a further example, in the cases of "A, B, and/or C" and "at least one of A, B, and C," such phrasing is intended to encompass the first listed option (A) only, or the selection of the second listed option (B) only, or the selection of the third listed option (C) only, or the selection of the first and the second listed options (A and B), or the selection of the first and third listed options (A and C) only, or the selection of the second and third listed options (B and C) only, or the selection of all three options (A and B and C). This may be extended, as readily apparent by one of ordinary skill in the art, for as many items listed.

The disclosure provides systems and methods to provide a multi-substrate coupling for photonic integrated circuits (PICs). Embodiments of the disclosure allow a groove (e.g., V-groove, U-groove, or equivalent surface feature for fiber attachment) to be formed in a different substrate from any substrate(s) where active PIC structures are formed. The substrates in some cases may be coupled together by a hybrid of metallic and insulative bonding, thus allowing the fiber attachment structure(s) to be formed independently of the PIC structure(s). In further examples, only dielectric-to-dielectric bonds may be present. A structure according to the disclosure may include a first substrate having a first surface. A groove is defined within the first surface of the first substrate. A second substrate includes a second surface coupled to the first substrate along the first surface thereof. The first substrate may be a handle wafer, i.e., a semiconductor structure for packaging and/or interconnecting of certain device components, whereas the second substrate may be a PIC wafer suitable for providing active device components and/or other structures such as wires, vias, etc. The second substrate includes a cavity that is substantially aligned with the groove of the first surface, e.g., for insertion and attachment of optical fiber(s) after the two substrates are coupled together. A PIC structure is within the second substrate and distal to the cavity.

FIG. 1 depicts a first cross-sectional view in the Y-Z plane of a structure 100 according to embodiments of the disclosure. Structure 100 may include multiple substrates 102, each identified as a first substrate 102a and a second substrate 102b. Substrates 102a, 102b may be similar or even identical in their composition and may be distinguished solely based on which components of structure 100 are formed therein. Moreover, substrates 102a, 102b may be coupled together through metal-to-metal and insulator-to-insulator bonding along a single interface, as also discussed herein. Each substrate 102 may have a composition suitable for processing and/or providing various active components. Second substrate 102b in particular may be structured for components including, e.g., several transistors in a complementary metal oxide semiconductor (CMOS) region to define a PIC structure for a device. Each substrate 102a, 102b may be at least partially formed of any currently known or later developed semiconductor material, which may include without limitation: silicon, germanium, silicon germanium, and substances consisting essentially of one or more III-V compound semiconductors having a composition defined by the formula $Al_{X1}Ga_{X2}In_{X3}As_{Y1}P_{Y2}N_{Y3}Sb_{Y4}$, where X1, X2, X3, Y1, Y2, Y3, and Y4 represent relative proportions, each greater than or equal to zero and X1+X2+X3+Y1+Y2+Y3+Y4=1 (1 being the total relative mole quantity). Substrate(s) 102a, 102b may be used to define, and/or may have a composition that is similar or identical to, various semiconductor waveguide structures (e.g., spot size converters, diffraction gratings, etc.) for transporting optical signals from an optical fiber 110 as discussed herein. Each substrate 102a, 102b additionally may include a pad insulator (e.g., a layer of oxide and/or other non-semiconductor materials such as oxide, etc.) for physically isolating semiconductor materials within each substrate 102a, 102b from each other, and particularly for electrically isolating PIC structure 116 from first substrate 102a and conductive components therein.

First substrate 102a may have a first surface 104 (e.g., on pad insulator 103) that is coupled (e.g., by various forms of bonding) to an opposite facing second surface 106 of second substrate 102b. First surface 104 may include a groove 108 for placement and attachment of optical fiber 110 therein. Groove 108 is depicted by example as being in the form of a "V-groove," but it is understood that groove 108 alternatively may include one or more of a U-groove, deep silicon trench, and/or other surface feature suitable for housing and attaching of optical fiber 110 to first substrate 102a. Optical fiber 110 may include a fibrous radiation-transmitting material such as, e.g., crystalline silicon, silicon nitride, fluoride-based fibers, chalcogenide-based fibers, plastic-based fibers, and/or other similar materials. Optical fiber 110 may be made of materials including, for example, silicon, silica, and/or silica doped material. In other non-limiting examples, optical fiber 110 may be formed as and/or may be coupled to one or more fluoride fibers, chalcogenide fibers, and/or plastic fibers. Optical fiber 110 additionally may include one or more layers of cladding material (not separately indicated) to physically protect the radiation-transmitting material(s) within optical fiber 110.

Groove 108 of first substrate 102a may be substantially aligned with a cavity 114 defined within second surface 106 of second substrate 102. Cavity 114 may extend partially or entirely through second substrate 102b and may be included, e.g., to enable placement and attachment of optical fiber(s) 110 within groove(s) 108 after first substrate 102a is coupled to second substrate 102b. Cavity 114 may be provided, e.g., to enable fiber attachment in groove(s) 108 after a PIC structure 116 is formed in second substrate 102b, but without requiring any groove(s) 108 to be formed within second substrate 102b. Although a majority of groove 108 and cavity 114 are shown by example to have vertically extending sidewalls, portions of substrate(s) 102a, 102b and/or pad insulators 103 may extend horizontally inwardly into groove 108 and/or cavity 114 in some implementations.

PIC structure 116 may include any currently known or later developed structure for providing electronic functions of a device, e.g., transistors, resistors, capacitors, metal wires arranged in various levels for interconnecting of device structures, vias for vertically interconnecting wires and components together, etc. Embodiments of structure 100 allow groove(s) 108 to be formed in substrate 102a and PIC structure(s) 116 to be formed in substrate 102b before the two substrates 102a, 102b are coupled together via a bonding interface P. Bonding interface P may be between first surface 104 of first substrate 102*a* and second surface 106 of second substrate 102*b*, and in addition may be vertically above groove 108.

Bonding interface P may be structured to enable coupling of non-conductive elements in substrate 102*a* to similarly non-conductive elements in substrate 102*b* and coupling of conductive elements in substrate 102*a* to similarly conductive elements in substrate 102*b*. Thus, the position and composition of such elements in structure 100 is discussed in further detail. Substrate 102*a* may include, e.g., a through-semiconductor via (TSV) 118 therein. TSV 118 may partially or completely pass through the semiconductive portions of substrate 102*a* to allow for stacking of multiple substrates (e.g., substrates 102*a*, 102*b*). TSV 118 may be particularly suitable for structure 100 as it may enable package-on-package device structures, since its composition density is higher, and it provides a shorter connection. TSV 118, in the particular cross-section of structure 100, may extend from one vertical end of substrate 102*a* to the other. TSV 118 is illustrated as not passing through pad insulator 103, but may also extend through pad insulator 103 in other implementations. TSV 118 may be formed of tungsten (W), copper (Cu), aluminum (Al), and/or other conductive materials and may include refractory metal liners (not shown) on its sidewalls to reduce or prevent electromigration degradation. TSV 118 also may include a dielectric liner (e.g., silicon oxide or similar material(s)) on its sidewalls, and where applicable such dielectric liners may be between substrate(s) 102*a*, 102*b* and the refractory metal liner to electrically isolate TSV 118 from the substrate 102*a*, 102*b* material(s).

To impede or prevent moisture ingress between substrates 102*a*, 102*b* through groove 108 and/or cavity 114, embodiments of structure 100 may include a moisture barrier film 120 ("barrier film 120") on any exposed surfaces (e.g., sidewalls and lower surfaces) of groove 108 and cavity 114. Barrier film 120 may be formed by conformal deposition or similar techniques to prevent buildup of liner material at the bottom of groove 108. Barrier film 120, when formed by such techniques, may also line an uppermost surface of second substrate 102*b* and may function as an etch stop layer in subsequent processing of a device. Barrier film 120 may include a nitride-based insulator (e.g., silicon nitride (SiN)) or similar insulative coatings formed in a desired thickness for physical and electrical insulation as known in the art. Barrier film 120 may be formed in multiple phases within each substrate 102*a*, 102*b* before substrates 102*a*, 102*b* are coupled together along bonding interface P. In further embodiments, barrier film 120 may be formed after first substrate 102*a* is coupled to second substrate 102*b*. Regardless of how it is formed, barrier film 120 may extend continuously through exposed surfaces of groove 108 and cavity 114 without being within bonding interface P.

Substrate 102*a* may include first conductors 122*a* (e.g., metal wires and/or vias) and second substrate 102*b* may include second conductors 122*b* (e.g., metal wires and/or vias) for electrically coupling active components within each substrate 102*a*, 102*b* together. Each conductor 122*a*, 122*b* may include the same or similar material(s) to those in TSV 118, e.g., copper (Cu), aluminum (Al), etc., with refractory metal liners (not shown) on their sidewalls. Each first conductor 122*a* of substrate 102*a* may be substantially aligned with a second conductor 122*b* of substrate 102*b*. Conductors 122*a*, 122*b* thus may be in contact with each other when substrate 102*a* is coupled to substrate 102*b*. Bonding interface P may be a bonded interface, i.e., it may couple conductors 122*a* to conductors 122*b* and it may couple pad insulators 103 of each substrate 102*a*, 102*b* together. Bonding interface P may be formed according to any currently known or later developed technique for providing metal-to-metal and insulator-to-insulator coupling along a single plane of contact. A "hybrid bonded" interface refers to any permanent bond that combines a dielectric bond (e.g., "SiOx") with at least one metallic bond (e.g., Cu within conductors 122*a*, 122*b*) to form interconnections. In some cases, a hybrid bonded interface may be provided via direct bond interconnects (DBIs). Hybrid bonding extends fusion bonding with embedded metal pads in the bond interface, which allows face-to-face connection of substrate (s) 102*a*, 102*b* along their respective surfaces 104, 106. In still further implementations, bonding interface P may indicate only a dielectric-to-dielectric bond (e.g., where no conductors 122*a*, 122*b* are present).

Figure 2:
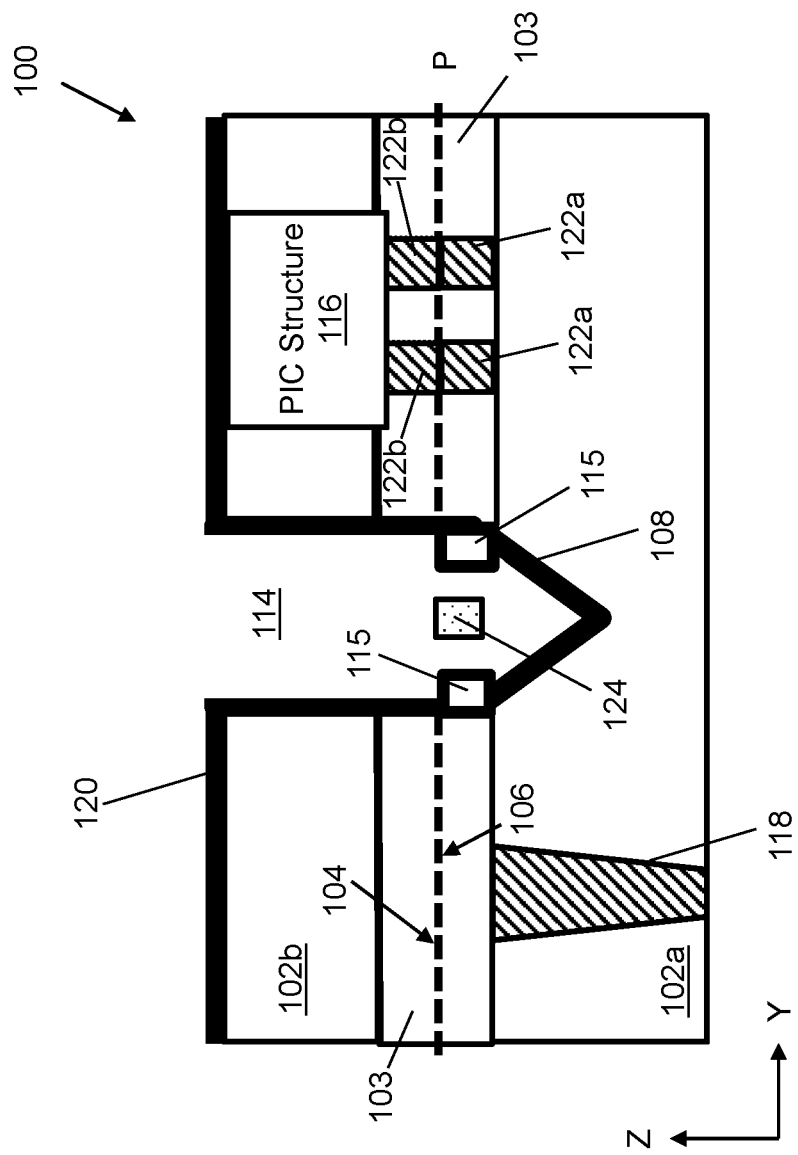
FIG. 2 shows a second cross-sectional view of a structure according to embodiments of the disclosure.
Figure 3:
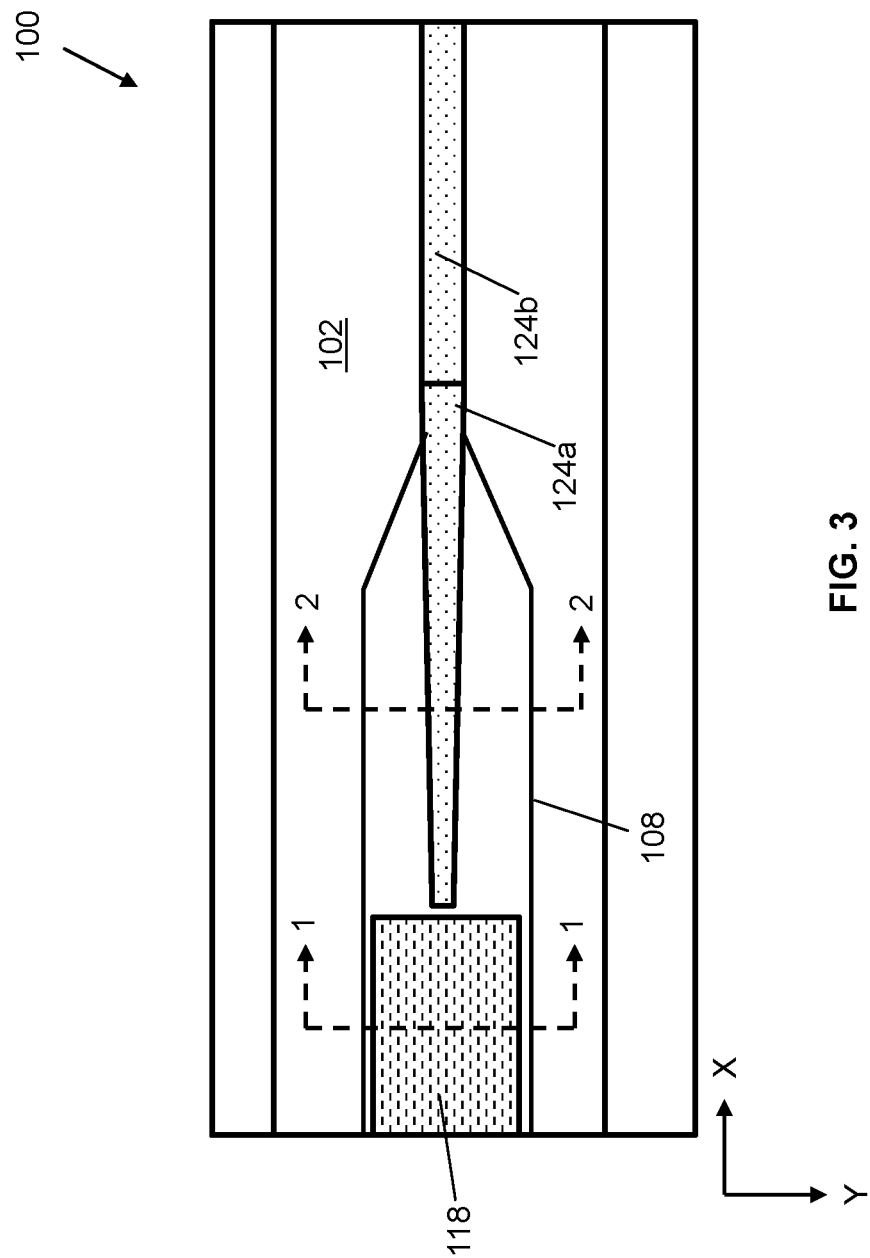
FIG. 3 shows a plan view of a structure according to embodiments of the disclosure.

Referring to FIGS. 1-3 together, in which FIG. 3 provides a plan view of structure 100 and FIGS. 1 and 2 provide two different cross-sectional views from perspective lines 1-1 and 2-2 of FIG. 3, further features of structure 100 are discussed. The cross-section shown in FIG. 1 depicts a portion of structure 100 with optical fiber 110 in groove 108. FIG. 2 depicts a different portion of groove 108 with a waveguide 124 (FIGS. 2, 3) therein. In the cross-section indicated n FIG. 2, insulators 103 may include protruding regions 115 extending inwardly into groove 108. Protruding regions 115, as discussed herein, may be included to prevent certain insulative materials from filling groove 108, i.e., they may allow deposited insulator(s) to "pinch off" without filling groove(s) 108 within first substrate 102*a*.

Waveguide 124 may be substantially aligned with optical fiber 110 (FIGS. 1, 3) (e.g., substantially along the X-axis as shown) and may be included within a spot size converter ("SSC") for converting and relaying radiation from optical fiber 110 into PIC structure 116. Waveguide 124 appears to be suspended within groove 108 or cavity 114 in FIG. 2 and subsequent cross-sections because a portion of waveguide 124 extends beyond groove 108 to be on or within substrate 102*a*, e.g., as shown in FIG. 3.

Waveguide 124 may take a variety of forms, e.g., it may be a layer of semiconductor material (e.g., silicon (Si), polycrystalline silicon (poly-Si), amorphous silicon (a-Si), etc.) and/or other semiconductor-based waveguide materials, or it may be another radiation transmitting compound (e.g., silicon nitride (SiN), silicon oxynitride (SiON), aluminum nitride (AlN), etc.) and/or any other currently known or later developed waveguide material. Such materials may include, e.g., one or more layers of cladding (e.g., one or more insulative materials such as silicon oxide ($SiO_2$), and/or other oxides, polymers, etc., not separately shown) for physically protecting the radiation-transmitting portions of waveguide 124. Waveguide 124, during operation, can couple radiation-encoded signals exiting optical fiber 110 to photodetectors and/or other radiation-sensitive components of PIC structure 116. Thus, one or more waveguides 124 of structure 100 may be within groove 108 of substrate 102*a* and substantially aligned with optical fiber(s) 110. Each waveguide 124 may be substantially aligned with cavity 114 of second substrate 102*b*, thus enabling waveguide(s) 124 to optionally be formed and/or placed in substrate 102*a* together with optical fiber(s) 110.

Embodiments of structure 100 are operable for use with a variety of waveguide 124 structures and configurations. For instance, as shown in FIG. 3, waveguide 124 may include a tapered portion 124*a* and a non-tapered portion 124*b*, e.g., for increasing the amount of optical coupling from optical fiber 110 that waveguide 124. Various tapered waveguide configurations are generally known in the art and may provide greater optical coupling of optical fiber 110 to certain PIC structure(s) 116. For example, tapered portion 124a may increase the power conversion efficiency, and reduce coupling losses for waveguide 124, as generally known in the art. Embodiments of the disclosure may allow waveguides 124 with tapered portion(s) 124a therein to be formed within first substrate 102a, or otherwise within cavity 114 of second substrate 102b, without affecting the forming of PIC structure(s) 116 (FIGS. 1, 2) elsewhere within second substrate 102b.

Figure 4:
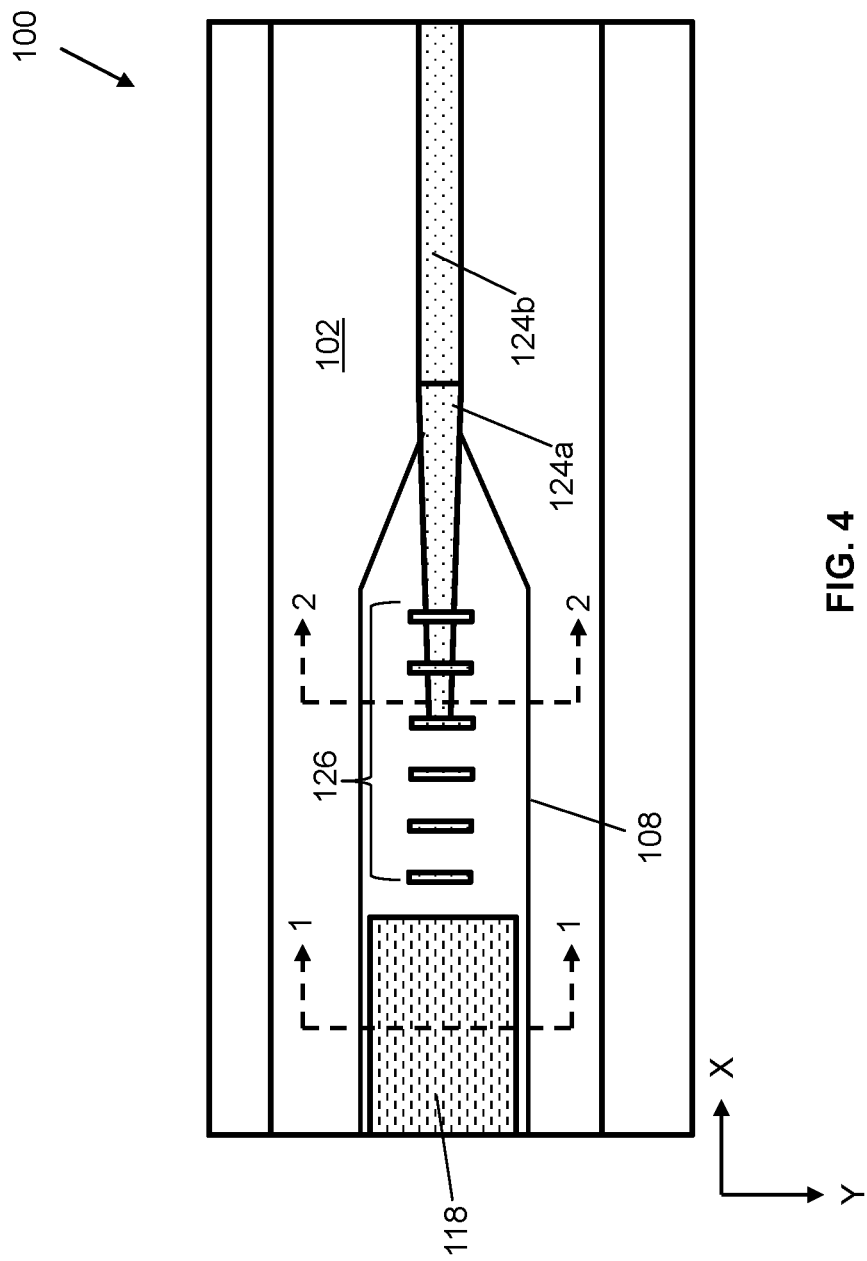
FIG. 4 shows a plan view of a structure according to further embodiments of the disclosure.

FIG. 4 depicts structure 100 and waveguide(s) 124 according to further embodiments. Waveguide(s) 124 optionally may include a set of proton exchange-type waveguides (PEGs) 126. PEGs 126, where included, may be within the structure of waveguide 124 or otherwise may occupy sections of groove 108 that are distal to optical fiber 110. In some cases, waveguide 124 itself may be composed solely of PEGs 126 (e.g., without horizontally extending and/or tapered sections, such as portions 124a, 124b). PEGs 126, where included, may provide different types of optical coupling as compared to other waveguides 124 discussed herein. PEGs 126 in particular may guide only horizontally or vertically polarized waves, based on their placement and orientation as generally understood in the art. Certain structures combining waveguide 124 and PEGs 126 together may be known as a "fishbone waveguide" or "partial fishbone," depending on the number of PEGs 126 and/or their size relative to the length of waveguide 124. These examples are non-limiting, and still further waveguide 124 structure may alternatively be within groove 108 and/or cavity 114. Thus, structure 100 can accommodate a wide variety of waveguide structures (e.g., waveguide 124, portions 124a, 124b thereof, PEGs 126, etc.) while still allowing groove(s) 108 to be formed only in first substrate 102a. Waveguide 124 and PEGs 126 may be referred to collectively herein as "waveguides 124, 126" to indicate that either or both of waveguide 124 and PEGs 126 may be present.

Figure 5:
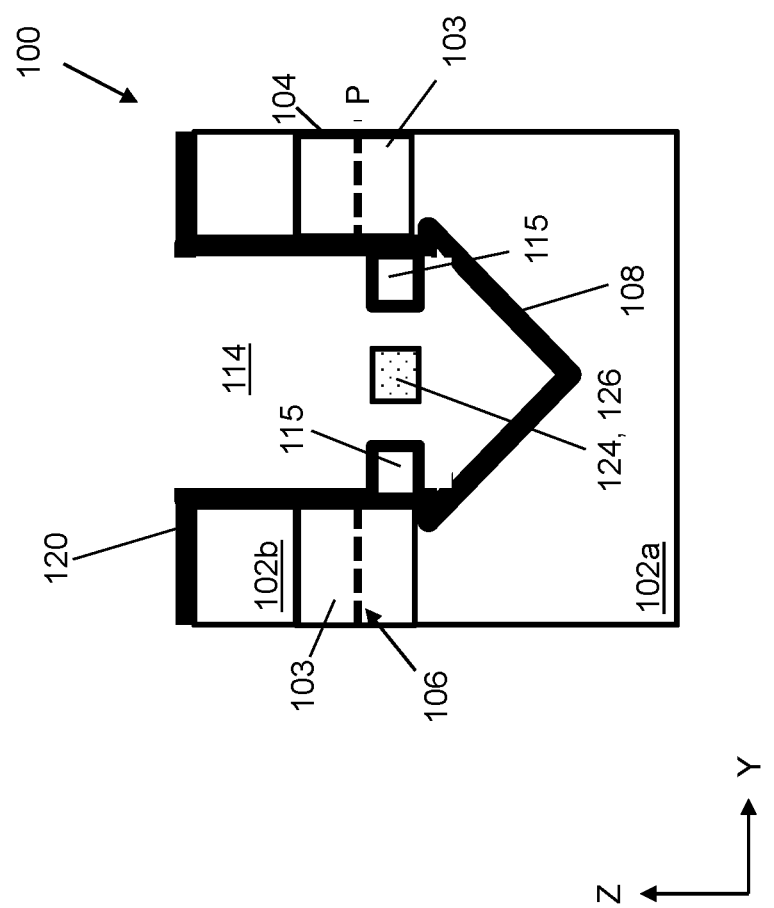
FIG. 5 shows an expanded cross-sectional view of a waveguide in a structure according to embodiments of the disclosure.
Figure 6:
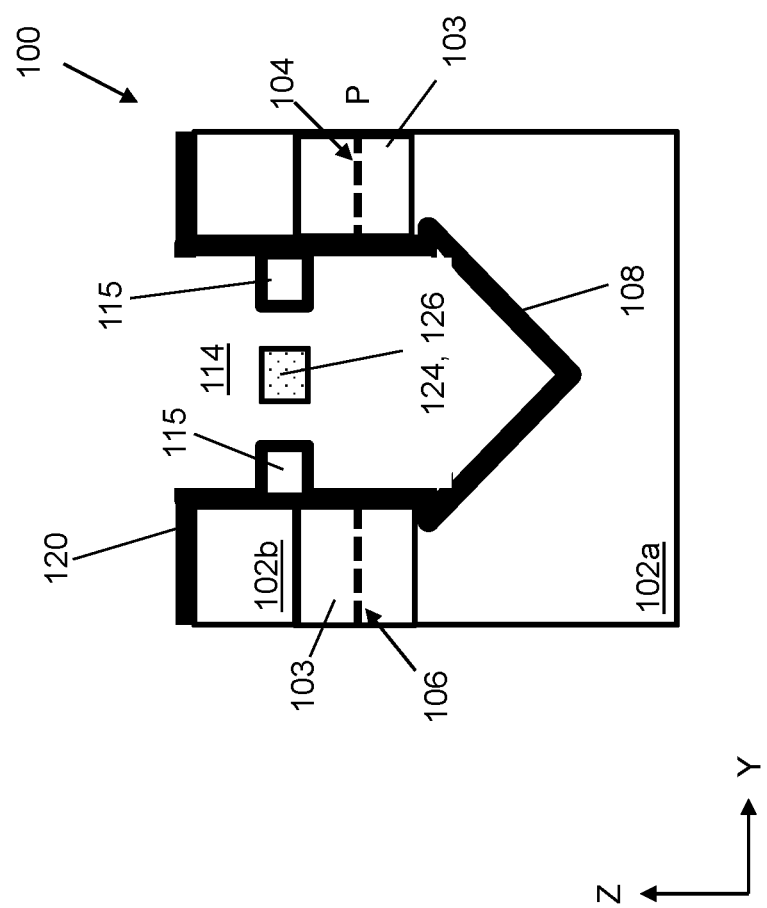
FIG. 6 shows an expanded cross-sectional view of a waveguide in a structure according to further embodiments of the disclosure.

Referring to FIGS. 5 and 6, waveguide(s) 124 and/or PEG(s) 126 (collectively "waveguide(s) 124, 126" hereafter) may be in a variety of vertical positions within groove 108 and/or cavity 114. FIG. 5 depicts a configuration where waveguide(s) 124, 126 are within groove 108 of first substrate 102a. FIG. 6 depicts a configuration where waveguide(s) 124, 126 are within cavity 114 of second substrate 102b. In either case, waveguide(s) 124, 126 may be horizontally adjacent semiconductive materials within substrate(s) 102a, 102b, or may be adjacent pad insulator(s) 103 of substrate(s) 102a, 102b. In either configuration, waveguide(s) 124, 126 may be formed within groove 108 or cavity 114 and substrate(s) 102a, 102b are coupled together along bonding interface P (FIGS. 1, 2). Waveguide(s) 124, 126 also may be horizontally aligned with optical fiber(s) 110 located in groove 108, and/or any portions of optical fiber(s) 108 within cavity 114.

Figure 7:
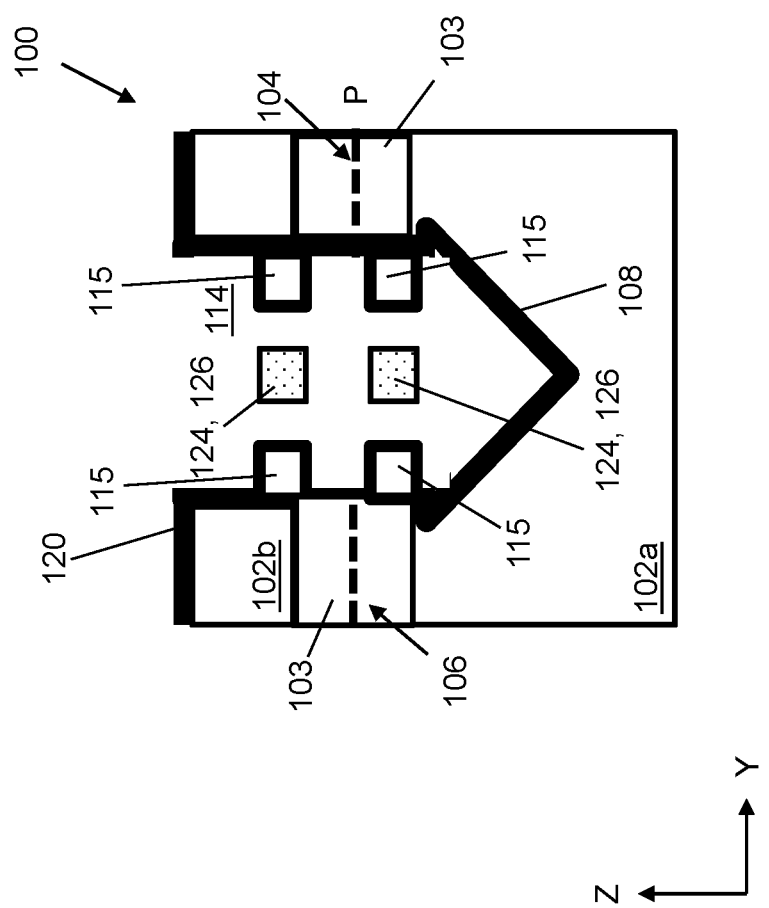
FIG. 7 shows an expanded cross-sectional view of multiple waveguides in a structure according to embodiments of the disclosure.

FIG. 7 depicts a further implementation in which multiple waveguides 124, 126 are within structure 100. In such implementations (e.g., an SSC or optical polarizer featuring vertically stacked waveguides 124, 126), at least one waveguide 124, 126 may be within first substrate 102a and at least one waveguide 124, 126 may be within second substrate 102b. Thus, some waveguides 124, 126 may be above bonding interface P while other waveguides 124, 126 may be below bonding interface P within groove 108 or cavity 114. Each waveguide 124, 126 regardless of position may be substantially aligned with optical fiber 110 due to optical fiber 110 being larger in diameter than each waveguide 124, 126.

Figure 8B:
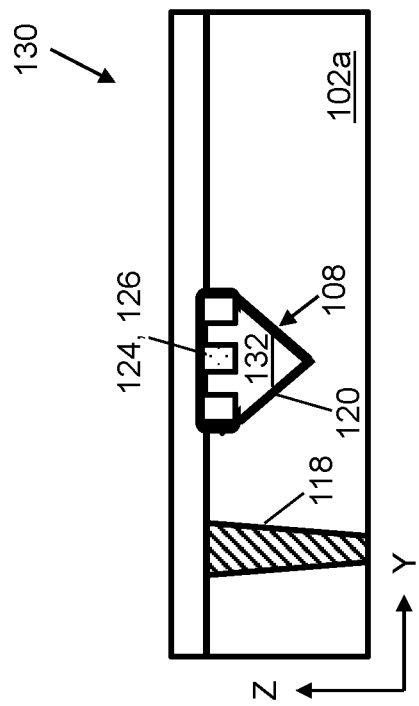
Figure 8A:
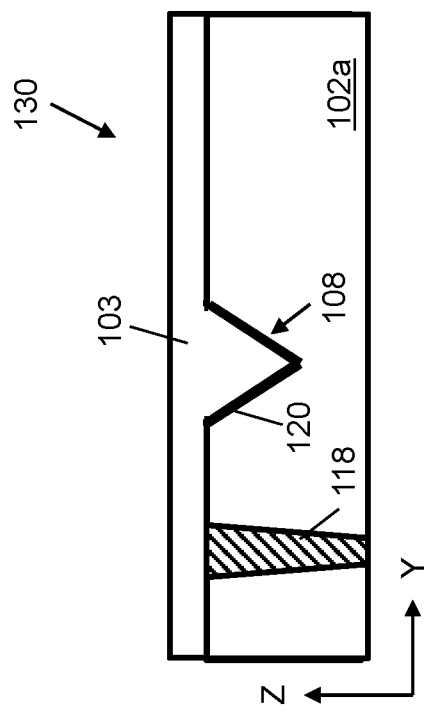
Figure 9B:
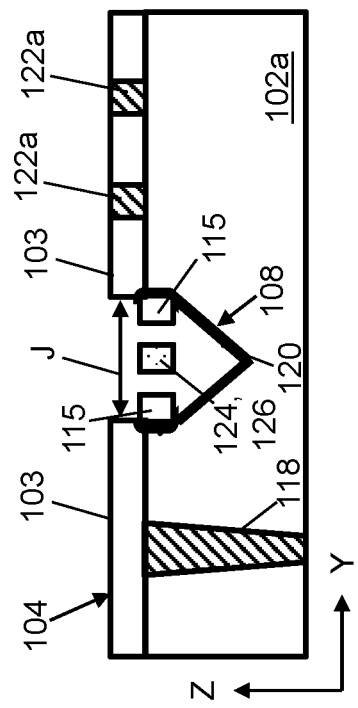
Figure 9A:
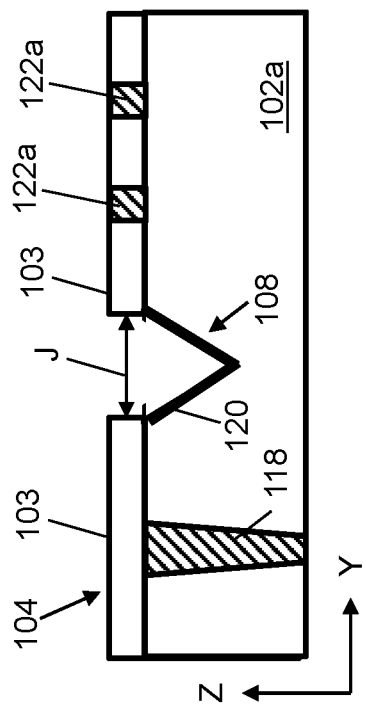

Turning FIGS. 8A and 8B, embodiments of the disclosure provide methods to form structure 100 (FIGS. 1-7) according to various techniques. FIG. 8A depicts a first cross-sectional view of a partially formed structure 130 and FIG. 9 depicts a second, different cross-sectional view of partially formed structure 130. The perspective shown in FIGS. indicated with the letter A (i.e., FIGS. 8A, 9A, 10A, 11A, 12A, 13A, 14A) corresponds to the position of view line 1-1 in FIG. 3, and the perspective in FIGS. indicated with the letter B (i.e., FIGS. 8B, 9B, 10B, 11B, 12B, 13B, 14B) corresponds to the position of view line 2-2 in FIG. 3. Partially formed structure 100 may include first substrate 102a before it is coupled to second substrate 102b (FIGS. 1, 2, 5-8A). Groove 108, TSV 118, and waveguide(s) 124, 126 may be provided within first substrate 102a, e.g., by repeated instances of deposition and etching as generally known in the art. Groove 108 in particular may be formed by forming a layer of silicon oxide and/or other masking material(s) on substrate 102a, removing portions of substrate 102a material (e.g., by etching to a predetermined depth and/or from a desired direction) to form the shape of groove 108 within substrate 102a. Creating partially formed structure 130 also may include forming barrier film 120 in groove 108 before removing the oxide (or other masking material).

Methods of the disclosure may include forming pad insulator 103 to cover first substrate 102a, barrier film 120 within groove 108, and to fill portions of groove(s) 108 where waveguide(s) 124, 126 are not present. Waveguide(s) 124, 126 may occupy significant space within groove 108, and thus prevent any significant amount of pad insulator 103 material from entering groove 108 due to the "pinch off" effect known in the art. Thus, an opening 132 may be present within groove 108 below any waveguides 124, 126 on partially formed structure 130.

FIGS. 9A and 9B depict the forming of conductor(s) 122a in pad insulator 103, and the removing of insulative material to expose groove 108, as procedures to enable coupling of first substrate 102a to second substrate 102b (FIGS. 1, 2, 5-7), e.g., using a hybrid of oxide and metallic bonding as discussed herein, using dielectric-to-dielectric bonds, and/or other forms of coupling. To form conductor(s) 122a, a mask (not shown) may be formed on pad insulator 103 without covering targeted portions of pad insulator 103 over groove 108 and first substrate 102a. These non-covered portions of pad insulator 103 can be removed, e.g., by etching and/or other techniques to remove insulative material from the surface of first substrate 102a. Conductor(s) 122a may be formed as metal(s) deposited within the removed portions of pad insulator 103, e.g., in locations where conductive couplings are desired on first substrate 102a. Conductor(s) 122a may not be formed in groove 108, e.g., to preserve space for coupling of optical fiber(s) 110 to enable the optical functions of structure 100. To prevent conductive materials from being formed in groove 108, an additional mask may be formed over groove(s) 108, and/or insulative material may be removed from groove 108 before or after the forming of conductors 122a.

FIGS. 10A and 10B depict coupling of first substrate 102a to second substrate 102b in embodiments of the disclosure. Methods of the disclosure enable forming of groove(s) 108 and conductor(s) 122a on first substrate 102a, and coupling of first substrate 102a to second substrate 102b along bonding interface P. Methods of the disclosure can include, e.g., mounting second substrate 102b on first substrate 102a such that second surface 106 of second substrate 102b is on first surface 104 of first substrate 102a. In this position, cavity 114 of second substrate 102b may be substantially aligned with groove 108 of first substrate 102a. Each substrate 102a, 102b may have a pad insulator 103 on portions of its surface 104, 106 and conductor(s) 122a, 122b on other portions of its surface 104, 106. Pad insulators 103 of each substrate 102a, 102b are aligned along bonding interface P and conductor(s) 122a, 122b of each substrate 102a, 102b similarly are aligned along bonding interface P. As discussed herein, first substrate 102a optionally may be coupled to second substrate 102b through a hybrid bonded interface, i.e., combining a dielectric bond (e.g., "SiOx") with embedded metal(s) (e.g., Cu within conductors 122a, 122b) to form interconnections. Such connections may be formed via any currently known or later developed technique, e.g., direct bond interconnections (DBIs). In the case of DBIs, the coupling of first substrate 102a to second substrate 102b may be implemented at relative low temperatures (e.g., room temperature) in a clean room or similarly low-contaminant environment as generally known in the art. Hybrid bonding, where implemented, allows face-to-face connection of substrate(s) 102a, 102b along their respective surfaces 104, 106. Bonding interface P may not be defined along any portion of groove 108, but instead is positioned along a portion of cavity 114 and above any surfaces defining the shape of groove 108 in first substrate 102a.

The coupling of first substrate 102a to second substrate 102b thus may couple conductors 122a, 122b together and electrically couple any active components of first substrate 102a to PIC structure 116 in second substrate 102b. With substrates 102a, 102b coupled together along bonding interface P, further processing according to the disclosure may include forming barrier film 120 within cavity 114 and above groove 108, e.g., by conformal deposition of dielectric materials on exposed surfaces, or other techniques to form insulative material. Barrier film 120, in the same process, also may coat any exposed surfaces of protruding regions 115 and/or waveguide(s) 124, 126 without filling groove 108. In the case of waveguide(s) 124, 126, barrier film 120 may provide additional cladding material to protect waveguide(s) 124, 126 from structural interference and/or other interactions with materials not configured for transmitting radiation. Subsequent processing may include placing optical fiber 110 (shown in dashed lines) in groove 108. The various processes of the disclosure may provide structure 100 (FIGS. 1-7) with any or all features discussed herein.

Figure 11B:
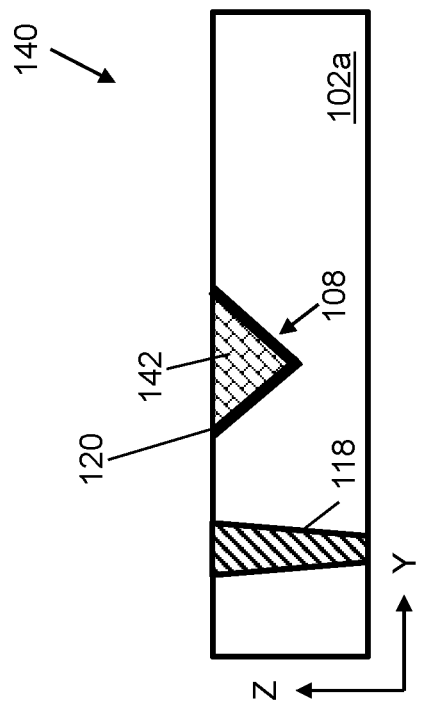
Figure 11A:
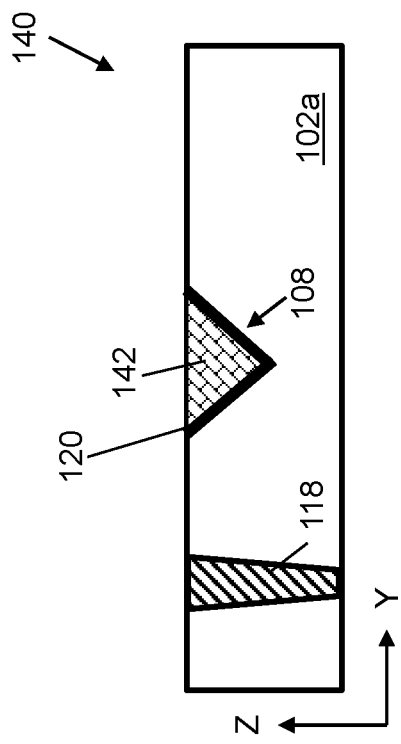

FIGS. 11A and 11B depict methods of forming structure 100 (FIGS. 1-7) according to further embodiments. In other implementations, a partially formed structure 140 may include groove 108 but does not initially include pad insulator 103 thereon. To allow coupling of substrate 102a to other materials as discussed herein, partially formed structure 140 may include barrier film 120 and a fill material 142 within groove 108. Here, pad insulator 103 may be absent from partially formed structure 140. Fill material 142 may include any currently known or later developed material capable of filling groove 108 without interacting with other materials coupled to and/or formed on first substrate 102a in other stages of processing. As examples, fill material 142 may include a thermally degradable material, an energy removal film (ERF), a low temperature oxide, and/or any material capable of being selectively removed from groove 108 (e.g., by one or more wet etchants). Fill material 142 may allow coupling of first substrate 102a to another substrate, and subsequent removing of fill material 142 may allow other components (e.g., optical fibers 110 (FIGS. 1, 3, 4) and/or waveguides 124, 126 (FIGS. 2-7) discussed herein to be placed in groove 108.

FIGS. 12A and 12B illustrate further processing in which pad insulator 103 and other materials are formed on first substrate 102a. Pad insulator 103 may be formed initially by depositing a single layer of insulative material to cover first substrate 102a and fill material 142 therein. Portions of pad insulator 103 then can be removed, e.g., by forming a mask (not shown) or other covering and removing portions of pad insulator 103 over fill material 142 and/or other selected portions of first substrate 102a. The mask or covering can be removed, and vacant portions of pad insulator 103 may be filled with first conductor(s) 122a as discussed elsewhere herein. As indicated specifically in FIG. 17, waveguide(s) 124, 126 can be formed on fill material 142 above certain portions of groove 108 where portions of pad insulator 103 have been removed.

Figure 13B:
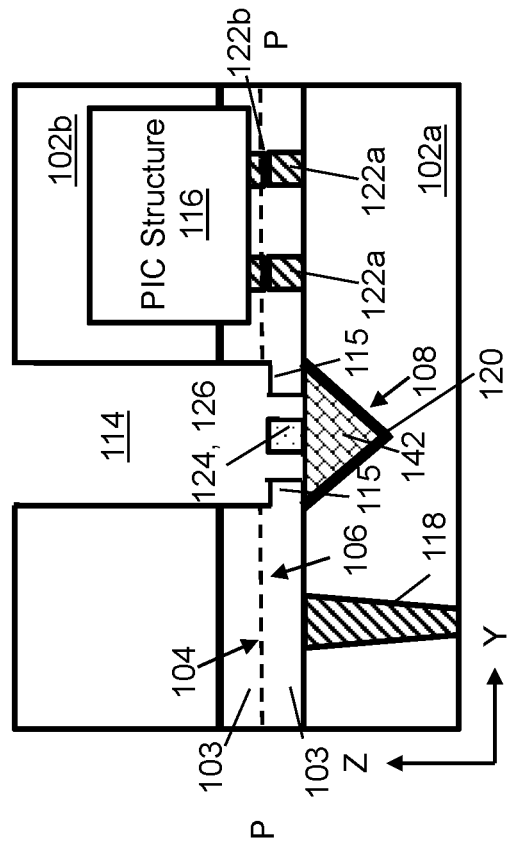
Figure 13A:
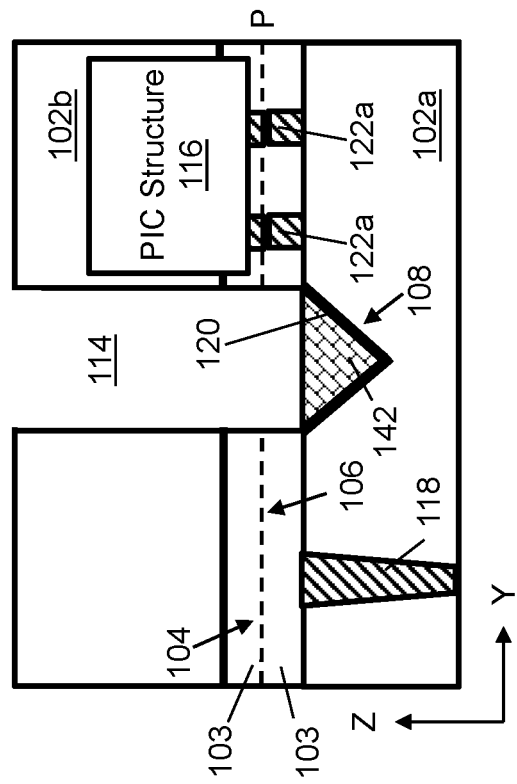

Referring to FIGS. 13A and 13B, remaining portions of pad insulator 103 may define a first surface 104 of first substrate 102a. First surface 104 of first substrate 102a may be coupled to second surface 106 of second substrate 102b using hybrid bonding techniques along bonding line P, and/or other types of bonds such as dielectric-to-dielectric bonding, substantially as described elsewhere herein. Such techniques may couple first conductor(s) 122a to second conductor(s) 122b and may couple pad insulators 103 of each substrate 102a, 102b together as discussed herein. The processing depicted in FIGS. 18 and 19 differs from other implementations described herein in that fill material 142 remains present within groove 108. Each substrate 102a, 102b may include a portion of cavity 114 above fill material 142.

Figure 14B:
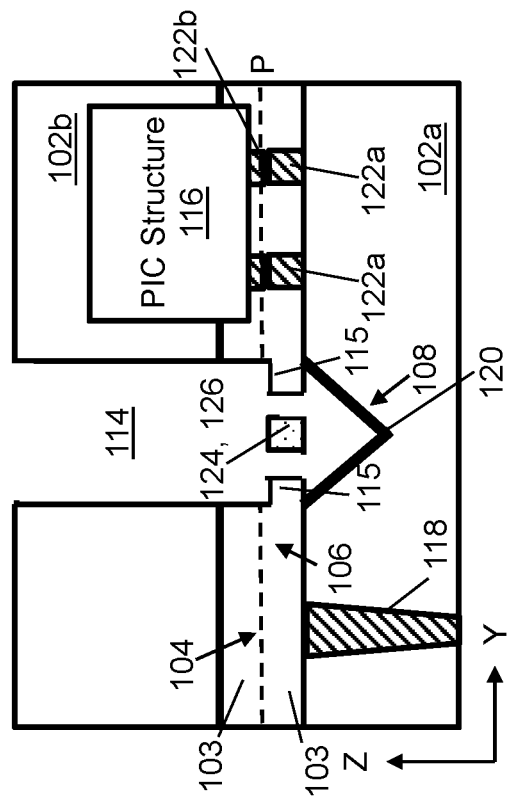
Figure 14A:
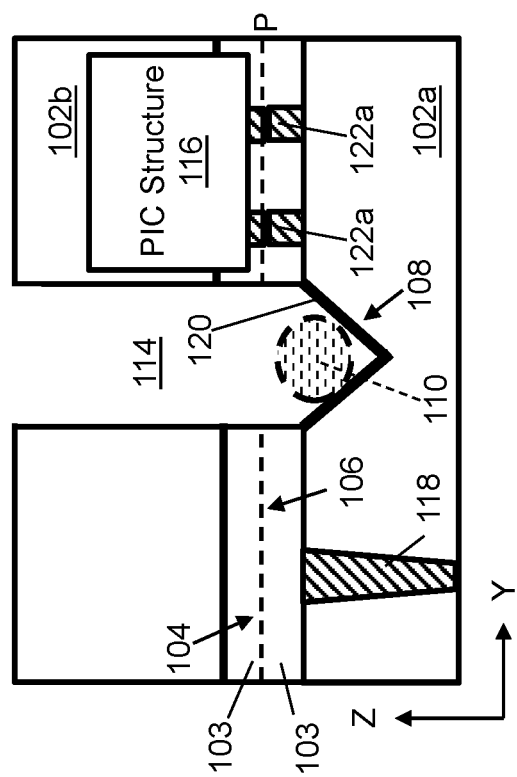

FIGS. 14A and 14B depict the removing of fill material 142 (FIGS. 11A-13B), e.g., by any process operable to remove the composition of fill material 142 from groove 108. Such processes may include, e.g., curing of fill material 142 by ultraviolet radiation and selectively removing the cured material, applying one or more wet etchants to cavity 114 and groove 108 to react with and remove fill material 142, etc. Waveguide(s) 124, 126 may remain intact over certain portions of groove 108, e.g., by having a composition that is non-reactive relative to any techniques and/or materials for removing fill material 142. With groove(s) 108 free of fill material 142, optical fiber(s) 110 (shown in dashed lines) may be placed within groove 108 through cavity 114, and/or additional barrier film 120 may be formed on or within second substrate 102b as discussed herein. Fill material 142 may preserve the position and shape of groove 108 in first substrate 102a in various stages of processing before fill material 142 is removed from groove 108. Forming of optical fiber(s) 110 in groove 108 and/or barrier film 120 in cavity 114 may yield structure 100 (FIGS. 1-7) in any of the various configurations discussed herein.

Embodiments of the disclosure provide various technical and commercial advantages, examples of which are discussed herein. Embodiments of the disclosure are operable for use with groove(s) 108 in a variety of shapes, including V-grooves, U-grooves, and/or other surface features shaped for placement of optical fiber(s) 110 (FIGS. 1, 3 4) therein. Methods and structures of the disclosure enable the use of optically active components (e.g., optical fiber(s) 110 and waveguide(s) 124, 126 (FIGS. 2-7)) in structures(s) 100 that include multiple substrates (i.e., first substrate 102a coupled to second substrate 102b discussed herein). Among other benefits, these structural features offer the flexibility to choose multiple types of substrate technologies (e.g., handle wafers, conventional PIC dies, and/or other semiconductor structures) for manufacture and use of devices integrating PIC technology. When applied to fabrication, the ability to use and bond multiple wafers, e.g., via a hybrid bonded interface or other types of bonding as discussed herein, may reduce yield loss that may otherwise arise from forming back end of line materials (e.g., PIC structure 116, conductors 122a, 122b, etc.) after optical fiber 110 is placed inside groove(s) 108.

The structure and method as described above are used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections and buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially" are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A structure, comprising:
   a first substrate including a first insulator layer over a first semiconductor layer, the first insulator layer having a first surface, the first insulator layer and a portion of the first semiconductor layer having a groove therein, wherein the first substrate includes:
      a dielectric protrusion above the first semiconductor layer and extending horizontally inward from a vertical sidewall of the first insulator layer, wherein a photonic integrated circuit (PIC) structure is above the first insulator and horizontally distal to the dielectric protrusion; and
   a second substrate including a second insulator layer and a second semiconductor layer thereon, the second insulator layer having a second surface coupled to the first surface of the first insulator layer, wherein the second substrate includes:
      a cavity within the second insulator layer and the second semiconductor layer, the cavity substantially aligned with the groove of the first substrate,
      wherein the first insulator layer is coupled to the second insulator layer along a bonding interface located above the dielectric protrusion and the PIC structure.

2. The structure of claim 1, wherein the bonding interface is a hybrid bonded interface including at least one dielectric bond and at least one metallic bond.

3. The structure of claim 1, further comprising a barrier film within the groove and the cavity.

4. The structure of claim 1, further comprising a first conductor within the first substrate and coupled to the PIC structure through a second conductor within the second substrate.

5. The structure of claim 1, further comprising a waveguide within the first substrate or the second substrate above a portion of the groove.

6. The structure of claim 5, wherein the waveguide defines a portion of a spot size converter.

7. The structure of claim 5, wherein the waveguide includes a first waveguide within the first substrate and a second waveguide over the first waveguide and within the second substrate.

8. The structure of claim 5, further comprising an optical fiber within the groove of the first substrate, wherein the optical fiber is substantially aligned with the waveguide.

9. The structure of claim 1, wherein the cavity extends entirely through the second semiconductor layer and the second insulator layer of the second substrate.

10. The structure of claim 1, further comprising a through semiconductor via (TSV) within the first substrate and horizontally distal to the groove.

11. A method comprising:
    forming a groove within a first substrate including a first semiconductor layer and a first insulator layer on the first semiconductor layer, the first insulator layer having a first surface;
    forming a dielectric protrusion above the first semiconductor layer and extending horizontally inward from a vertical sidewall of the first insulator layer, wherein a photonic integrated circuit (PIC) structure is above the first insulator and horizontally distal to the dielectric protrusion;

forming a cavity within a second substrate, the second substrate including a second insulator layer and a second semiconductor layer thereon, the second insulator layer having a second surface; and coupling the first surface to the second surface along a bonding interface located above the dielectric protrusion and the PIC structure, wherein the cavity is substantially aligned with the groove.

12. The method of claim 11, wherein coupling the first surface to the second surface includes forming a hybrid bond including at least one dielectric bond and at least one metallic bond between a conductor within the first substrate and a conductor within the second substrate.

13. The method of claim 11, further comprising forming a barrier film within the groove and the cavity.

14. The method of claim 11, wherein a first conductor within the first substrate is coupled to the PIC structure through a second conductor within the second substrate.

15. The method of claim 11, further comprising forming a waveguide within the first substrate or the second substrate above a portion of the groove.

16. The method of claim 15, further comprising providing an optical fiber within the groove of the first substrate and coupled to the waveguide within the first substrate.

17. A method comprising:

forming a groove within a first substrate including a first semiconductor layer and a first insulator layer on the first semiconductor layer, the first insulator layer having a first surface, wherein the first substrate includes a conductor horizontally distal to the groove;

forming a dielectric protrusion above the first semiconductor layer and extending horizontally inward from a vertical sidewall of the first insulator layer, wherein a photonic integrated circuit (PIC) structure is above the first insulator and horizontally distal to the dielectric protrusion;

forming a cavity within a second substrate, the second substrate including a second insulator layer and a second semiconductor layer thereon, the second insulator layer having a second surface;

forming a waveguide within the first substrate above a first portion of the groove; and providing an optical fiber within a second portion of the groove, wherein the optical fiber is aligned with the waveguide; and coupling the first surface to the second surface along a bonding interface located above the dielectric protrusion and the PIC structure, wherein the cavity is substantially aligned with the groove.

18. The method of claim 17, further comprising forming a barrier film within the groove and the cavity, wherein the barrier film includes an etch stop material.

19. The method of claim 17, further comprising forming a through semiconductor via (TSV) within the first substrate and distal to the groove.

20. The method of claim 17, wherein coupling the first surface to the second surface includes forming a hybrid bond including at least one dielectric bond and at least one metallic bond between the conductor within the first substrate and a conductor within the second substrate.

* * * * *